Patented June 14, 1932

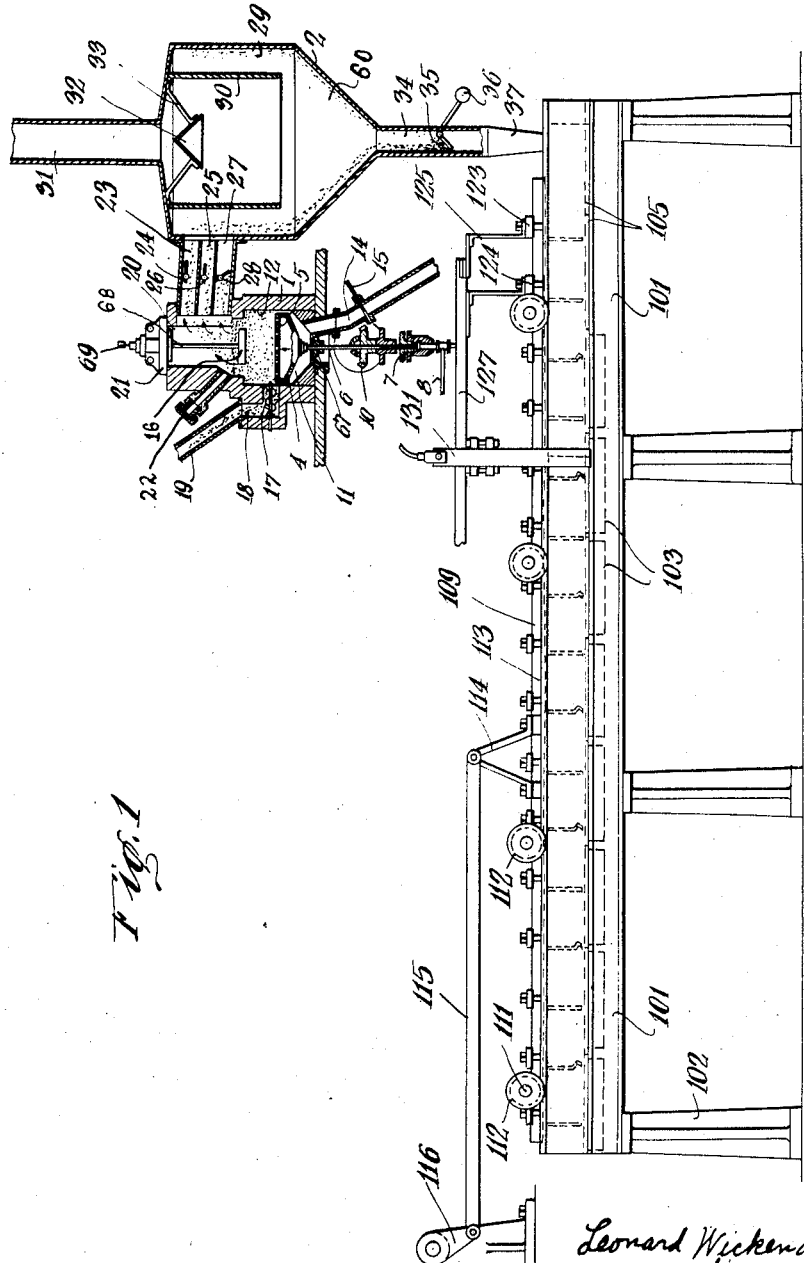

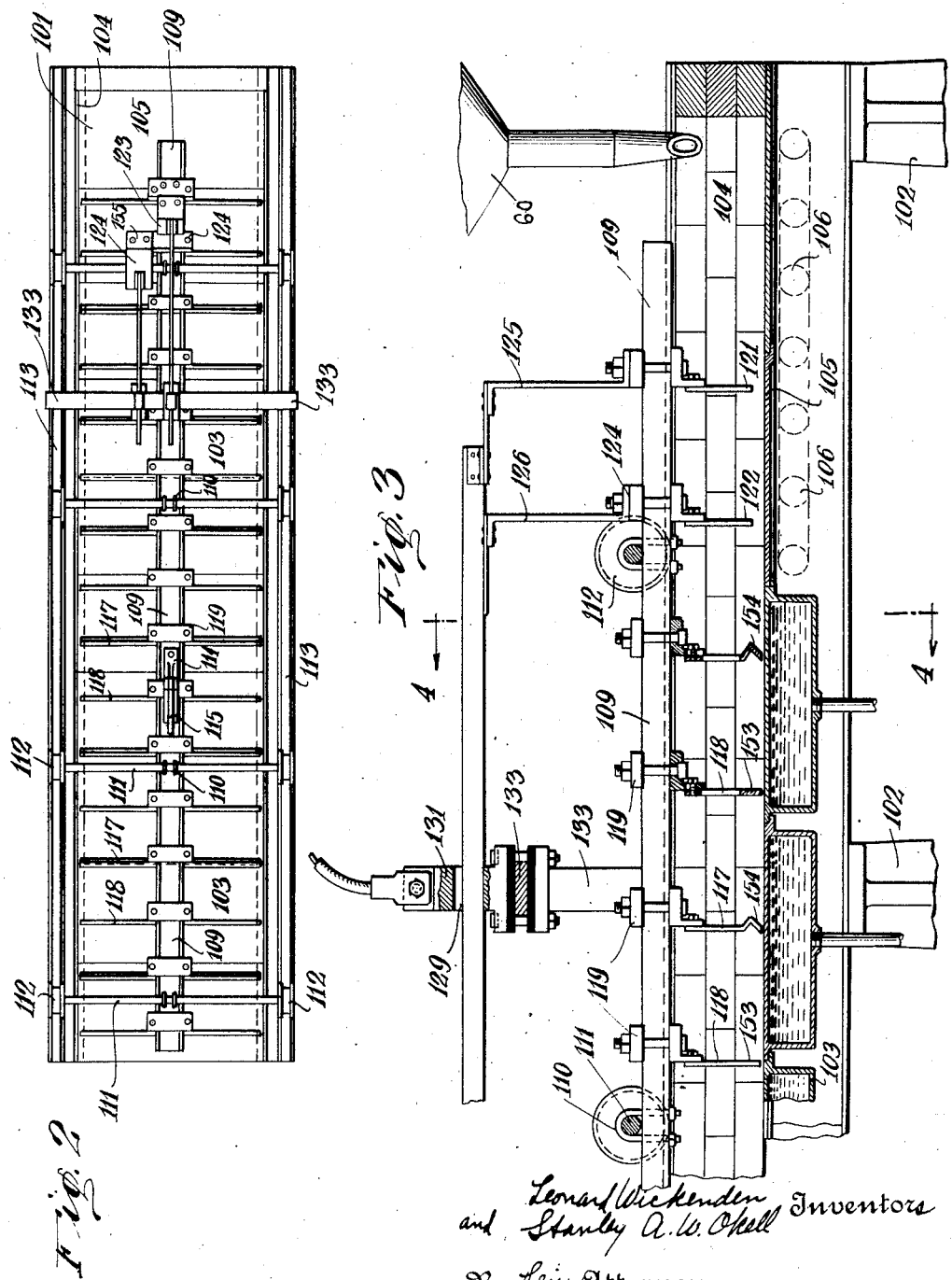

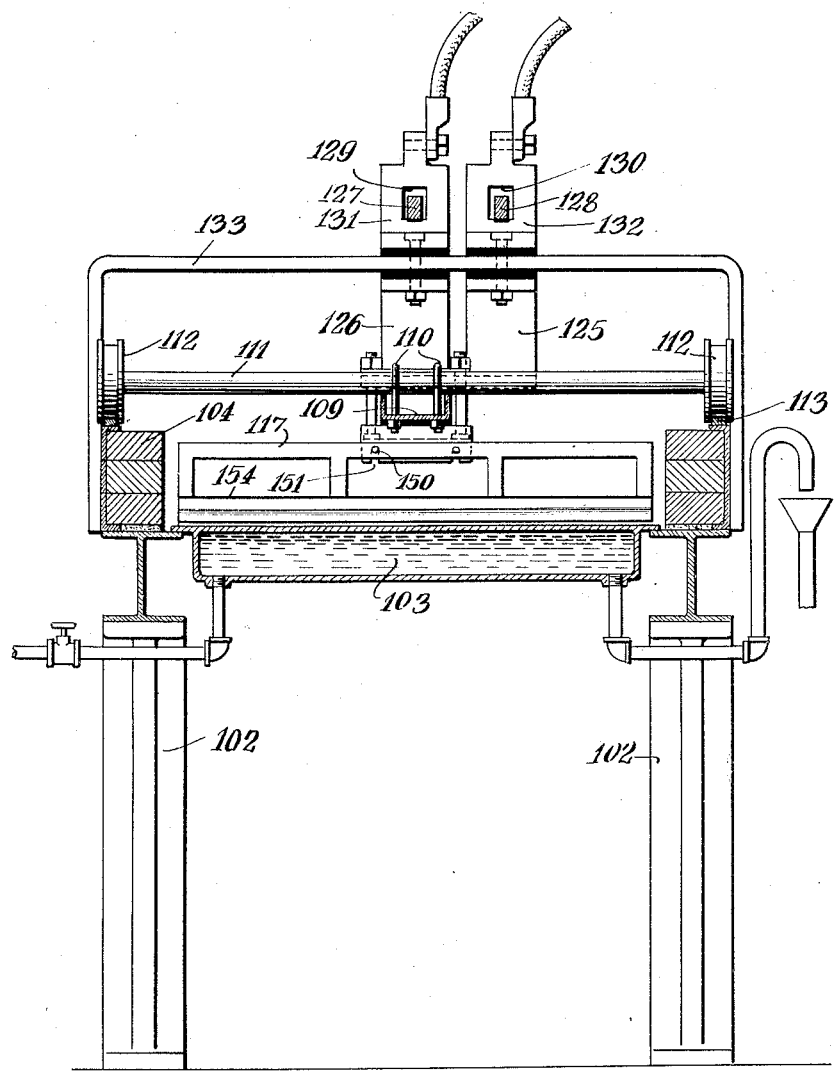

1,863,361

UNITED STATES PATENT OFFICE

LEONARD WICKENDEN, OF MANHASSET, NEW YORK, AND STANLEY A. W. OKELL, OF CRANFORD, NEW JERSEY, ASSIGNORS TO JOHN J. NAUGLE, OF RYE, NEW YORK

MEANS FOR PREPARING DECOLORIZING CARBON AND THE LIKE

Application filed August 9, 1928. Serial No. 298,609.

Our present invention relates to apparatus for preparing activated carbons, particularly of vegetable origin, especially but not exclusively such activated vegetable carbons as are derived from calcined carbonized residues obtained by calcining carbonaceous fluids, such as the alkaline liquors obtained in the manufacture of wood pulp from resinous and like woods by the so-called "soda process". It is an object of the present invention to devise apparatus of the general character specified which is simple in construction, which may be readily, conveniently and economically fabricated and assembled, and which may be efficiently operated to prepare activated vegetable carbons characterized by a high degree of activation corresponding to a high degree of decolorizing power, a high degree of porosity permitting high rates of filtration, and also having great strength so as to withstand the strains and stresses of mechanical handling and revivifying, the activated vegetable carbons prepared in the apparatus of the present invention being capable of being reactivated an indefinite number of times after use so as to be brought back to their original high state of activation. Other objects and advantages of the apparatus of the present invention will, in part, be pointed out in detail hereinafter and will, in part, be obvious to those skilled in the art to which the present invention relates.

In the accompanying specification we shall describe, and in the annexed drawings more or less diagrammatically show, an illustrative embodiment of the apparatus of the present invention. It is, however, to be clearly understood that our invention is not limited to the specific embodiment thereof herein shown and described for purposes of illustration only. In the accompanying specification we shall also describe, and in the annexed drawings more or less diagrammatically exemplify, a form of method which may be conveniently and successfully practised in the aforesaid illustrative embodiment of the apparatus of the present invention. It is, however, to be clearly understood that such form of the method is not restricted in its practise to the aforesaid illustrative embodiment of the apparatus of the present invention, nor is such apparatus restricted in its use to the practice of the aforesaid form of the method, the method itself forming no part of the present invention but being fully described and being fully claimed in our copending application filed of even date herewith and entitled "Methods of preparing decolorizing carbons and the like".

Referring now to the drawings more or less diagrammatically illustrating the aforesaid illustrative embodiments of the apparatus of the present invention and more or less diagrammatically exemplifying the aforesaid form of the method which may be conveniently and successfully practised in such embodiment of the apparatus:

Fig. 1 shows, in a more or less diagrammatic way, the aforesaid illustrative embodiment of the apparatus of the present invention suitable for practising the aforesaid illustrative form of the method;

Fig. 2 is a plan view of the secondary electric furnace constituting a portion of such form of the apparatus;

Fig. 3 is a longitudinal sectional view, on an enlarged scale, of the portion of the apparatus illustrated in Fig. 2 of the drawings; and Fig. 4 is a cross sectional view, on an enlarged scale, taken along line 4—4 of Fig. 3 of the drawings.

Before describing the aforesaid illustrative embodiment of the apparatus of the present invention, it may be desirable to describe the aforesaid form of the method which may be conveniently and successfully practised in such form of apparatus. In practising such method, in the manufacture of a highly activated decolorizing carbon of vegetable origin, we utilize a multiple-heat activating process by means of which the dissolved vegetable matter contained, for instance, in the waste soda liquors formed when paper pulp is made by the caustic "soda process", is calcined and converted into a granular carbonized material which is leached and which for that reason is generally called "leacher refuse" in the paper making industry. The leached carbonaceous calcined material, which will be found to be of an open or porous character and which may be reduced to uniform size by a suitable grinding operation, may be given an acid wash with a weak solution of hydrochloric acid to remove soluble mineral and other substances which would tend to make the material alkaline. It is, of course, to be clearly understood that in place of carbonized material derived from dissolved vegetable matter obtained as a by-product of the soda process of making paper pulp the waste liquors from the sulphite process of making paper pulp or equivalent liquors from other sources may be utilized.

The calcined and preferably acid washed material is now heated to a temperature above about 750 degrees C. as between about 750 degrees C. and about 950 degrees C., generally about 900 degrees C., preferably in an electric furnace, as by the passage of electric heating currents therethrough in such a manner as to destroy or remove objectionable hydrocarbons and complex carbon components. This heating preferably takes place in the presence of treating gases generally of an oxidizing character, such as steam, carbon dioxide or the like, or mixtures of the same, these gases being converted to reducing gases by interaction with the carbon of the material being treated, so that there is maintained generally a reducing atmosphere in the furnace during the initial heat treating process. This initial heat treatment results in giving to the calcined carbonaceous material or its equivalent a preliminary activating treatment.

The preliminary activated material is now subjected to a second heating treatment at a relatively low temperature, as between about 350 degrees C. and about 450 degrees C., preferably in a shallow layer in the presence of a gaseous oxidizing medium, such as the open air, the material being at the same time given a back and forth movement so as to expose substantially all of the particles of the calcined carbonaceous material and substantially all of the superfices of the same to a partial or selective, or both partial and selective, oxidizing action. Preferably the heating in this case is also effected by the passage of electric heating currents through the charge of calcined carbonaceous material, such heating taking place in an open electric furnace of suitable construction.

It may here be stated that for the first heating stage to a relatively high temperature, which heating preferably takes place in an electric furnace of suitable type, the heating may be effected in accordance with the method and employing the apparatus shown and described in a portion of a patent issued to us July 5, 1927, No. 1,634,480, entitled "Electric furnace apparatus and process for making decolorizing carbon". It may here further be stated that for the second heating stage, preferably to a relatively low temperature and preferably likewise conducted in an electric furnace, we may preferably employ the method described and claimed in our copending application Serial No. 298,610, filed Aug. 9, 1928, entitled "Method of preparing and activating decolorizing carbon and the like", preferably employing the type of apparatus illustrated in our copending application Serial No. 47,480, filed August 1, 1925, and entitled "Method and apparatus for the activation or revivification of carbon".

We have discovered that the portion of the method of our patent referred to above, corresponding to the first heating stage at a relatively high temperature, cooperates in an unexpected and remarkably effective manner with the steps of the process of our copending application Serial No. 298,610, filed Aug. 9, 1928, entitled "Method of preparing and activating decolorizing carbon and the like" in a combined process constituting a novel and highly important arrangement of steps which is ideally suited for the treatment of carbonaceous material in the formation of highly activated decolorizing carbons. Similarly, that portion of the apparatus of our previously issued Patent No. 1,634,480, identified above, corresponding to the first or high temperature portion of the apparatus, cooperates in an unexpected and highly successful manner with the type of apparatus described and claimed in our copending application Serial No. 47,480, identified above, in the formation of a combined apparatus which is novel and the different portions of which cooperate in an unexpected and highly effective manner for the manufacture of highly activated decolorizing carbons.

The second heating operation at a relatively low temperature preferably takes place in the open air. During this portion of the treatment the material is in a relatively shallow layer and is preferably moved back and forth while being maintained at a temperature of between about 350 and about 450 degrees C. The heating, as already stated, preferably takes place in an electric furnace and is preferably effected by the passage of electric heating currents through the material. The material may now be acid washed, washed with water, ground and then dried.

The result is a highly activated carbon which is of uniformly high quality and which may be made in an economical manner and with minimum losses of the raw material due to combustion. At the same time the resulting product is of a very open or porous character and is characteristic by its high filtering capacity and its high decolorizing, deodorizing and like purifying power.

Referring now to the aforesaid illustrative embodiment of the apparatus of the present invention in which the aforesaid form of the method may be conveniently and successfully practised, and with reference particularly to the drawings illustrating the same, the primary electric furnace 1 may be formed of brick work or other suitable material so as to provide a furnace chamber which is preferably substantially vertical and which may have an inside dimension or diameter of from about two to about four feet, more or less, at least throughout the lower part 12, adjacent the heating electrodes. A feed screw 17 may be installed near the bottom of this treating chamber and may communicate with a vertical feed hopper or chamber 18 into which the carbon is fed from the chute 19 so as to accumulate in this hopper and prevent undesirable discharge of steam or gases as the screw 17 gradually feeds the carbon into the furnace during its operation.

This charge 13, of granular carbon, is preferably substantially uniformly sized and may be granular calcined carbon of uniformly porous character which may be formed by calcining at high temperatures, preferably in the presence of carbon dioxide, the dissolved vegetable matter contained, for instance, in the waste soda liquors formed when paper pulp is made by the caustic soda process, although, generally, similar carbonized material may be formed from the waste liquors from the sulphite wood pulp process. Such light, uniformly porous carbon or other carbonized material or charcoal of various grades is preferably purified by acid washing or similar treatment before being fed into the electric furnace where it is brought to the high heat of about 900 degrees C., more or less, and treated with steam, carbon dioxide or other treating gases in various proportions for fifteen to thirty minutes, more or less, depending upon the temperature and treating gases employed, so that the hydrocarbon or complex carbon components are destroyed or eliminated and the subsequent activation of the carbon greatly facilitated. Such high temperature treatment has been found decidedly beneficial for this purpose, and in many cases, even where no steam injection is used, carbon heated to such high temperatures flames up and burns with a whitish flame when limited quantities of oxygen are admitted and this flame deposits water on a cold surface placed above it, thus indicating that hydrocarbons or other carbon compounds containing hydrogen are being eliminated by this treatment.

In order to heat the carbon to this high temperature in a substantially uniform manner, it is advantageous to use heating electrodes which may comprise the upper electrode 16 having a series of narrow, radially projection arms so as to give ample electric contact with the carbon and yet not interfere unduly, especially on the outside of the furnace chamber, with the upward gas currents which may be used to agitate the granular carbon and remove treated portions thereof from time to time. This upper electrode 16 may advantageously be formed of relatively infusible heat-resistant metal or other suitable material and connected by the stem 68 passing freely through the removable furnace cover 21, the chain or suspending member 69 preferably having insulating links or members serving to raise this upper electrode when required during the operation of the furnace.

The furnace may be provided with a lower rotary blast electrode 4 of hollow heat-resistant metal or other suitable material which may have a perforated upper face 5 provided with a series of apertures through which may issue steam jets into the furnace chamber, as indicated by the arrows in Fig. 1 of the drawings. This electrode, together with its connected hollow stem 6, may be rotated by the gearing 10, and steam or other treating gases may be supplied to this stem through the pipes 8 and 9 and the packing joint 7, an upper bearing 67 being preferably provided for the stem adjacent the lower electrode 4. A free space 11 may be provided below this rotary electrode, and to remove clinker etc. therefrom, a clean-out or discharge passage, such as 14, may be provided and a gate valve 15 installed therein, which gate valve is kept closed since no quantities of air are to be admitted to the furnace. A peep hole 22 may also be provided, as indicated, or at other parts of the furnace chamber, as desired.

The lower electrode 4 may be rotated at the desired rate of from about four to about ten revolutions per minute, more or less, while the steam or other injecting fluid may issue through the nozzle openings in its upper surface so as to promote the uniform agitation and treatment of the furnace charge. At the same time, the heating currents supplied to these electrodes pass through the intervening carbon particles so as to develop heat therein by their resistance and by such arcing action as may take place during the agitation of the charge. This electric heating should be sufficient, in connection with the heat which may be developed by oxidation of the carbon material where more or less oxidizing gases are used for the injection treatment, to raise the carbon, at least in the active zone of the furnace, to suitable refining temperature of from about 800 to about 950 degrees C., more or less, the steam or other treating and separating gases agitating and carrying up the carbon particles in a seemingly boiling agitated mass, the lighter particles, at least, being projected considerably above the upper electrode 16 so as to separate, perhaps in connection with the chemical action taking place in this mass of porous carbon, from the rest of the carbon mass the lighter or outer more friable portions of carbon which have been treated to a greater extent. These smaller and lighter carbon particles may thus be carried up by the jets or currents of treating gases so as to be carried out of the furnace chamber through the discharge passage or conduit communicating with the centrifugal or other suitable separator 2.

As shown in the drawings, a multiple passage may be used between these elements by providing passages 23, 25 and 27, each of which is controlled by valves or doors 24, 25 and 28, respectively, so that the carbon may be withdrawn from any desired level near the top 20 of the furnace chamber. As indicated in the drawings, the two upper valves are swung into their open horizontal positions so as to leave the two upper passages 23 and 25 open to take off the upper suspended carbon particles which are carried over into the separator and given a more or less rotary motion around the outer compartment 29 thereof outside the cylindrical baffle 30, so that the carbon particles tend to fall into the lower collecting cone 60 so as to pass into the vertical chute 34. The gas currents are allowed to pass at low speed around the lower edge of this baffle 30 and past one or more of the other baffles, such as 32, which may be held, as by the supports 33, in this central space communicating with the flue 31 up which the heated air and very light ash particles are carried during the operation of the furnace.

The carbon, which has been given this high temperature preliminary treatment, thus collects in the vertical chute 34 which is preferably provided with a counter-weighted or automatic feed valve 35 which may have a weighted arm 36 so as nearly to close this passage and build up a mass of carbon above the valve before the weight of the carbon forces it to open sufficiently to allow the gradual feed of this treated carbon down the feed chute 37 and into the secondary low temperature activating furnace.

For the second or open air heating stage of the process, we preferably employ the open trough electric furnace illustrated more particularly in Figs. 2, 3 and 4 of the drawings. Preferably the preliminarily activated carbon from the separator 2 is fed into the secondary electric furnace while it is still in its heated condition, although, of course, it may, if so desired, be permitted to cool. This secondary furnace may be constructed as follows: 101 represents a long shallow trough which may be made about 15 feet long and about 3 feet wide. It is mounted at a convenient height on standards 102. The bottom of trough 101 is advantageously lined with water-cooled cast iron plates 103, except near the feed end, and the sides with refractory material 104, as is best illustrated in Figs. 3 and 4 of the drawings.

Near the feed end of the trough the bottom is lined with cast iron plates 105 which are not provided with water jackets like the plates 103. Beneath the plates 105 are a series of gas burners 106 which furnish an alternative or auxiliary heating means to the electrical means hereinafter described. Carbonized residues of the type above mentioned may conveniently be heated by such electrical means, but some other types of carbon cannot be effectively heated by the electrical method. For such other types of carbon heating means such as the gas burners 106 may be successfully employed.

Near the center of the trough is suspended a bar 109 which may be conveniently made of channel iron. The bar 109 is suspended by iron straps 110 from a series of cross bars 111. The cross bars 111 are provided at either end with grooved wheels 112 which roll on tracks 113 on each side of the trough. A wish bone 114 extends upward from the bar 9 and is pivoted at the top to a link 115 which is connected to a suitable power mechanism, such as a crank 116, whereby the bar 119 is caused to reciprocate when the apparatus is in use. From the bar 119 are suspended a series of rakes 117 and 118 which are attached to the bar by clamps 119. The rakes 117 and 118 extend across the trough, as indicated in Fig. 4 of the drawings and are adjustably attached to the clamps 119 by set screws 150 in slots 151 so that the bottom of the rakes may be adjusted to clear the bottom of the trough by a narrow margin.

It is usually desirable, as best illustrated in Figs. 3 and 4 of the drawings, to have some of the rakes, as 118, provided with straight bottom cross bars 153 so that they serve only for purposes of agitation, while some of the rakes, as 117, are provided with V-shaped bottom cross bars 154 which tend to propel the charge gradually through the trough. The propelling rakes 117 are so shaped that the rakes tend to slide through the charge more or less on the back stroke and to hold the charge more effectively on the front stroke. Thus the charge is gradually advanced through the trough.

The charge, advantageously in a hot condition, is fed into the trough from the separator 2 and tends to pile itself in a sloping mound at the feed end of the trough until it comes in contact with the electrode rakes 121 and 122. These electrode rakes 121 and 122 are attached to the bar 109 by means of clamps 123 and 124 which are carefully insulated from the bar 109 by sheets of mica or other suitable insulating material, as shown in Fig. 3. The clamp 124 is banded with a lateral extension 155, as shown in Fig. 3. From the clamp 123 and lateral extension 155 of clamp 124, uprights 125 and 126 connect horizontal bars 127 and 128 which slide through slots 129 and 130 in the electric brushes 131 and 132. The electric brushes 131 and 132 are advantageously clamped upon a wicket 133 which bridges the trough and are carefully insulated from the wicket 133 by strips of mica, or other suitable material, as indicated in Figs. 3 and 4 of the drawings. The parts 121, 122, 123, 124, 125, 126, 127 and 128 are made of material suitable for the conducting of electricity and are electrically connected to each other and to a suitable source of electric current at the brushes 131 and 132.

The oscillating electrode rakes 121 and 122 are raised materially above the bottom of the trough so that the current passes through a substantial thickness of the carbon material from one electrode rake to the cast iron bottom and thence through a similar thickness to the other electrode rake. If desired, the bottom plates 105 may be made of insulating material, such as brick work, in which case the path of the current is through the charge from one electrode rake to the other. In this case it is not necessary to raise the rakes 121 and 122.

The rakes 121 and 122 may, if desired, be shaped like the rakes 117 to propel the charge. But gravity usually provides a sufficient propulsive force when the sloping pile of carbon particles at the feed end of the trough is agitated by flat rakes, as illustrated in the drawings. It is, of course, important, as already indicated above, that the temperature be carefully controlled so as to prevent too high a degree of heat which might cause excessive combustion, or too low a temperature which might not be sufficient to burn away the "fines" and other unactivatable portions of the comminuted carbonaceous material being treated.

The current is adjusted to heat the charge to suitable activating temperatures, such as about 450 degrees C. Once heated, the charge tends to maintain, or even increase, its heat as it passes through the trough, due to the partial oxidation or combustion of the charge. The average temperature of the mass is, therefore, regulated and the combustion limited by means of the cooling devices 103, the average temperature being gradually lowered to below the combustion point as the charge arrives at the discharge end of the trough. At the discharge end of the trough the charge is suitably collected as it passes to any suitable bin or conveyor, not here shown.

For purpose of original activation an open trough, such as illustrated in the drawings, is generally advantageous. But when our invention is used for revivification purposes, it is frequently possible to activate the material with less combustion than will occur in the open trough. Hence, it is sometimes desirable to cover the trough in a suitable manner in order to control the quantity of air admitted, as by means of dampers along the sides of the trough, and to provide a flue for the discharge of the products of combustion, none of which additional parts need here be shown.

This completes the description of the aforesaid form of apparatus which may be conveniently and successfully employed in the practise of the aforesaid forms of the methods. In operating the apparatus in the practice of the aforesaid illustrative embodiments of the methods of the present invention, the waste liquors from the soda process of making paper pulp, for example, may be carbonized or calcined, preferably at a temperature of about 900 degrees C., more or less, in a rotary kiln or the like. Thereafter, the material is leached with water to remove as much as possible of the contained water-soluble alkaline and other substances, after which the leached carbonized or calcined material, now known as carbonized lignin residues or "leacher refuse", may be given an acid wash, as with a weak solution of hydrochloric acid, to further reduce its content of alkaline and other soluble mineral and other substances. For this purpose we may employ a half or one per cent. solution of hydrochloric acid since this acid is volatile and will permit the ultimate formation of a substantially neutral carbon which it is one of the purposes of the present invention to produce.

The leached and acid washed material may now be dried, or, if desired, may be sent directly into the first electric furnace for the first or relatively high temperature heating treatment. We prefer, however, that the material shall be preliminarily dried so as to economize the heat values of the first electric furnace and to prevent the generation of excessive amounts of steam in the first electric furnace which might cause material to be blown out and would also tend to cause excessive dusting.

In this initial or primary electric furnace the material is subjected to a relatively high temperature usually for a period of from about 20 to about 30 minutes, more or less. The temperature is generally above about 800 degrees C., as between about 850 to about 900 degrees C., generally about 850 or 900 degrees C. Treating gases of an oxidizing character are added, such as superheated steam under from about 5 to about 10 pounds pressure, more or less, the steam or equivalent treating gases acting as the treating, agitating and separating medium. It may here be stated, however, that in certain instances the gas, while it serves as a treating gas, has a minor or only secondary function as an agitating means and still less the function of a separating gas, the material flowing over into the passages 123, 125 and 127 controlled by the valves or gates 124, 126 and 128, respectively, by the movement induced in the material by the constant feeding of the material into the chamber 113 by means of the conveyor 117.

In this first or primary electric furnace the material is given a primary or initial activating treatment, objectionable hydrocarbons being removed or destroyed and complex carbon components being likewise removed or destroyed. It may here be stated that while the treating gas or gases in their initial condition, as introduced into the furnace, are of an oxidizing character, reducing conditions prevail generally in the furnace, that is, the gases are converted by the carbon present, assuming that steam is used, into hydrogen and carbon monoxide, or water gas, this being a reducing gaseous mixture.

The treated and refined carbon may be run, while still considerably heated, from the separator, where the material has been received from the first electric furnace, into the secondary activating electric furnace where it may advantageously be subjected to an oxidizing activating treatment, in the open air, while being given a backward and forward movement, at a temperature of between about 350 and about 500 degrees C., more or less, for example, about 400 degrees C. By reducing the temperature, the desired activating treatment may be effected while minimizing combustion which would take place very rapidly at higher temperatures. In this way greater economy results. Furthermore, due to the backward and forward movement given to the material and the shallow layer in which the material is being treated, a uniform and highly activated product results. In this way an increase in production amounting to 30, 40 or even 50 per cent., more or less, may be secured.

While the ash content of the original calcined carbonized leacher refuse, in its dry condition, after it has been acid washed, is generally from about 1½ to about 3 per cent., when it comes from the first furnace it generally has a higher percentage of ash due to the fact that some of the carbon content has been burned away, this ash content now amounting generally from about 2½ to about 5 per cent. In the second electric furnace this ash content is further increased, generally to from about 4 to about 6 per cent. The ash content may be reduced and a relatively neutral carbon produced by an acid wash with a weak solution of hydrochloric acid, as ½ to 1 per cent. solution of hydrochloric acid. Furthermore, by floating the carbon in the acid solution in which it is preferably treated after it has left the second heating treatment, a final carbon may be obtained which, after being dried so as to expel any residual hydrochloric acid, is not only neutral, so that it may be used with complete success in the treatment of sugar and like solutions where an acid carbon would be harmful since it might cause inversion, but is also of a high degree of porosity and is very highly activated, containing often as little as ½ per cent. or 1 per cent. of ash. Such a carbon often has a degree of activation corresponding to 1000, or often 1100, more or less, units on the kerosene red scale.

This completes the description of the aforesaid illustrative embodiment of the apparatus of the present invention. It will be noted that such apparatus is simple in construction, may be easily and economically fabricated and assembled, and is highly efficient in operation for the intended purpose. By means of the apparatus of the present invention, a highly activated decolorizing carbon, characterized by its high degree of decolorizing power, its high degree of porosity and its mechanical strength and resistance to deterioration, may be readily and economically produced, the carbon being further characterized by the fact that it may be reactivated an indefinite number of times so as to restore it to its original degree of activation. Other superiorities and advantages of the apparatus of the present invention, in construction, operation and use, especially as exemplified in the aforesaid illustrative embodiment of the same, will readily occur to those skilled in the art to which the present invention relates. It may here be stated that the "leacher refuse" referred to earlier in this specification need not be ground before being activated but may be so ground after activation, the latter being the preferable practice in the usual case. It may here further be stated that the determination of the decolorizing power of the vegetable carbons made in accordance with the principles of the present invention in terms of units on what has been termed the "kerosene red scale" is in accordance with standard practice using such scale which is well known to those skilled in the art to which the present invention relates.

What we claim as our invention is:

1. Electrical apparatus for the treatment of subdivided carbonaceous material and the like, comprising a primary electric furnace for heating said material in the absence of air, and a secondary electric furnace for heating the preliminarily heated material to a lower temperature in the open air.

2. Electrical apparatus for the treatment of subdivided carbonaceous material and the like, comprising a primary electric furnace for heating said material in the absence of air, a secondary electric furnace for heating the preliminarily heated material to a lower temperature in the open air, and means to move said material backwards and forwards to bring about its intimate mixture with the air.

3. Electrical apparatus for the treatment of subdivided carbonaceous material and the like, comprising a primary electric furnace for heating said material in the absence of air, and a secondary electric furnace for heating the preliminarily heated material to a lower temperature in the open air, said secondary electric furnace including a long shallow trough and means for agitating and propelling said material through said trough.

4. Electrical apparatus for the treatment of subdivided carbonaceous material and the like, comprising a primary electric furnace for heating said material in the absence of air, a secondary electric furnace for heating the preliminarily heated material to a lower temperature in the open air, and means for cooling the bottom of said secondary electric furnace to control the combustion of said material.

5. Electrical apparatus for the treatment of subdivided carbonaceous material and the like, comprising a primary electric furnace for heating said material in the absence of air, a secondary electric furnace to heat the preliminarily heated material to a lower temperature in the open air, means associated with said secondary electric furnace to move said material backwards and forwards in shallow layers to cause its intimate contact with the air, and means for cooling the bottom of said secondary electric furnace to control the combustion of said material.

6. Electrical apparatus for the treatment of subdivided carbonaceous material and the like, comprising a primary electric furnace, to heat said material, a secondary electric furnace to heat the preliminarily heated material to a lower temperature, said secondary electric furnace including a long shallow trough, and means for agitating and propelling said material through said trough, and means for cooling the bottom of said trough to control the combustion of said material.

7. Electrical apparatus for the treatment of subdivided carbonaceous material and the like, comprising a primary electric furnace to heat said material, a secondary electric furnace to heat the preliminarily heated material to a lower temperature, and means associated with said secondary electric furnace, including a plurality of rakes to move said material backwards and forwards in shallow layers to cause its intimate contact with the air.

8. Electrical apparatus for the treatment of subdivided carbonaceous material and the like, comprising a primary electric furnace to heat said material, and a secondary electric furnace to heat the preliminarily heated material to a lower temperature, said secondary electric furnace including a long shallow trough and means for agitating and propelling said material through said trough, said means including a plurality of rakes to move said material backwards and forwards in shallow layers.

In testimony whereof, we have signed our names to this specification this 7th day of August, 1928.

LEONARD WICKENDEN.
STANLEY A. W. OKELL.